US005795669A

United States Patent [19]
Wilkinson et al.

[11] Patent Number: 5,795,669
[45] Date of Patent: Aug. 18, 1998

[54] ELECTRODE

[75] Inventors: David Wilkinson; Henry H. Voss; Keith B. Prater, all of North Vancouver, Canada; Graham A. Hards, Wallingford, United Kingdom; Thomas R. Ralph; David Thompsett, both of Reading, United Kingdom

[73] Assignees: Johnson Matthey Public Limited Company, London, England; Ballard Power Systems, Inc., North Vancouver, Canada

[21] Appl. No.: 628,161

[22] Filed: Apr. 5, 1996

[30] Foreign Application Priority Data

Apr. 5, 1995 [GB] United Kingdom ............... 9507012

[51] Int. Cl.$^6$ .................................................. H01M 4/86
[52] U.S. Cl. ................... 429/40; 429/14; 429/17; 429/41; 429/44; 204/286; 204/290 R; 204/290 F; 204/291; 204/292
[58] Field of Search .................................. 429/40, 41, 44, 429/45, 14, 17; 204/286, 290 R, 290 F, 291, 292

[56] References Cited

U.S. PATENT DOCUMENTS 4,407,905 10/1983 Takeuchi et al. ........................ 429/42
4,980,037 12/1990 Hossain et al. ........................ 429/40
5,523,177 6/1996 Kosek et al. ........................... 429/40

FOREIGN PATENT DOCUMENTS

| 0 557 673 A1 | 9/1993 | European Pat. Off. . |
| 909459 | 10/1962 | United Kingdom . |
| 1074561 | 7/1967 | United Kingdom . |
| 2190399 | 11/1987 | United Kingdom . |
| 87/05445 | 9/1987 | WIPO . |
| WO 92/02965 | 2/1992 | WIPO . |
| WO 94/09523 | 4/1994 | WIPO . |

OTHER PUBLICATIONS

Niedrach et al, "Catalytic enhancement of carbon monoxide and reformer gas oxidation in fuel cells by sodium tungsten bronze", abstract Jan. 1969.

Wilson et al, "Electroctalysis issues in polymer electrolyte fuel cells", abstract Aug. 8–13, 1993.

*Primary Examiner*—Bruce F. Bell
*Attorney, Agent, or Firm*—Pillsbury Madison & Sutro LLP

[57] ABSTRACT

An electrode comprises a first catalytic component active at gas-phase reaction sites and a second catalytic component active at electrochemical reaction sites wherein each catalytic component is present either as a separate layer, or a single mixed layer or a combination of a separate layer and a single mixed layer. The electrode has an improved tolerance to poisons such as carbon monoxide and carbon dioxide.

14 Claims, 3 Drawing Sheets

ELECTRODE

BACKGROUND OF THE INVENTION

(1). Field of the Invention

This invention relates to an improved electrode and in particular to an electrode for use in a fuel cell having an improved tolerance to electrocatalyst poisoning species in the reactant fuel and oxidant streams.

(2). Description of the Prior Art

In a fuel cell, a fuel, which is typically hydrogen, is oxidised at a fuel electrode (anode) and oxygen, typically from air, is reduced at a cathode, to produce an electric current and form product water. An electrolyte is required which is in contact with both electrodes and which may be alkaline or acidic, liquid or solid. The liquid electrolyte phosphoric acid fuel cell (PAFC) operating at a temperature of 190° C. –200° C., is a type of fuel cell close to commercialisation and will find applications in the multi-megawatt utility power generation market and also in combined heat and power, ie co-generation systems, in the 50 to several hundred kilowatt range. In solid polymer fuel cells (SPFCs) or proton exchange membrane fuel cells (PEMFCs), the electrolyte is a solid proton-conducting polymer membrane, commonly based on perfluorosulphonic acid materials. The electrolyte must be maintained in a hydrated form during operation in order to prevent loss of ionic conduction through the electrolyte. This limits the operating temperature of the PEMFC typically to between 70° C. and 120° C. depending on the operating pressure. The PEMFC does, however, provide much higher power density output than the PAFC, and can operate efficiently at much lower temperatures. Because of this, it is envisaged that the PEMFC will find use in vehicular power generation and small scale residential power generation applications. In particular, vehicle zero emission regulations have been passed in areas of the United States which are likely to restrict the use of the combustion engine in the future. Pre-commercial PEMFC-powered buses and prototype PEMFC-powered vehicles are now being demonstrated for these applications.

Due to these relatively low temperatures, the oxidation and reduction reactions require the use of catalysts in order to proceed at useful rates. Catalysts which promote the rates of electrochemical reactions, such as oxygen reduction and hydrogen oxidation in a fuel cell, are often referred to as electrocatalysts. Precious metals, and in particular platinum, have been found to be the most efficient and stable electrocatalysts for all low temperature fuel cells, operating below 300° C. The platinum electrocatalyst is provided as very small particles (~20–50 Å) of high surface area, which are often, but not always, distributed on, and supported by, larger macroscopic conducting carbon particles to provide a desired catalyst loading. Conducting carbons are the preferred materials to support the catalyst due to their corrosion resistance to acidic electrolytes. The electrodes include electrocatalyst material and should be designed to enhance contact between the reactant gas (ie hydrogen or oxygen), the electrolyte, and the precious metal electrocatalyst. The electrode is porous, and is often known as a gas diffusion (or gas porous) electrode, since it allows the reactant gas to enter the electrode from the face of the electrode exposed to the reactant gas stream (back face), and the electrolyte to penetrate through the face of the electrode exposed to the electrolyte (front face), and products, particularly water, to diffuse out of the electrode.

In the PEMFC the electrodes are bonded to the solid polymer electrolyte, which is in the form of a thin membrane, to form a single integral unit known as the membrane electrode assembly (MEA).

In practice, these gas diffusion electrodes typically comprise in addition to the electrocatalyst material, other non-catalytic components, such as polymeric binders, the various components together forming one or more layers, and supported on a porous electrically-conducting substrate material, for example, conducting carbon materials (papers, cloths, foams) or, particularly in the case of non-acid electrolyte fuel cells, metal meshes of nickel or steel grids. In the case of other applications employing gas diffusion electrodes, such as electrochemical sensors, various forms of polytetrafluoroethylene (PTFE) sheet are also typically employed as supporting substrates.

In most practical fuel cell systems the hydrogen fuel is produced by converting a hydrocarbon-based fuel such as methane, or an oxygenated hydrocarbon fuel such as methanol, to hydrogen in a process known as reforming. This reformate fuel contains in addition to hydrogen, high levels of carbon dioxide ($CO_2$), of around 25%, and small amounts of impurities such as carbon monoxide (CO), typically at levels of around 1%. For fuel cells operating at temperatures below 200° C., and especially for the PEMFC operating at temperatures around 100° C., it is well known that CO, even at levels of 1–10 ppm, is a severe poison for the platinum electrocatalysts present in the electrodes. This leads to a significant reduction in fuel cell performance, ie the cell voltage at a given current density is reduced. This deleterious effect is more pronounced with the lower operating temperature PEMFC.

Various methods have been employed to alleviate anode CO poisoning. For example, reformer technology has been redesigned to include an additional catalytic reactor, known as a preferential or selective oxidation reactor. This involves the injection of air or oxygen into the hydrogen containing reactant gas stream prior to passing over the selective oxidation catalyst to oxidise the CO to $CO_2$. This can reduce the levels of CO from 1–2% down to below 100 ppm. However, even at these levels the anode electrocatalyst in the PEMFC is still poisoned.

It has also been found that poisoning of the electrocatalyst by CO at levels of 1–100 ppm can be reduced by the use of an oxygen or air bleed directly into the anode gas stream just before it enters the anode chamber of the fuel cell itself. This is described by S Gottesfeld and J Pafford in Journal Electrochem. Soc., Vol 135, 1988, p2651. The technique is believed to have the effect of oxidising the residual CO in the fuel to $CO_2$ the reaction being catalysed by electrocatalyst sites present in the anode:

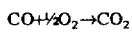

$$CO + \tfrac{1}{2}O_2 \rightarrow CO_2 \qquad\qquad 1$$

This technique provides fuel cell performance that is much closer to the performance observed if no CO was present in the fuel stream.

A further technique for alleviating fuel cell performance reduction due to anode CO poisoning is to employ an anode electrocatalyst which is itself intrinsically more poison tolerant, but which still functions as a hydrogen oxidation catalyst in the presence of CO. With this approach it is not necessary to employ the air bleed technique described above to obtain improved performance. As described by, for example, L Niedrach et al in Electrochemical Technology, Vol. 5, 1967, p318, the use of a bimetallic anode electrocatalyst comprising platinum/ruthenium, rather than the more conventionally used mono-metallic platinum only electrocatalyst, shows a reduction in the poisoning effect of the CO at typical PEMFC operating temperatures. The bimetallic catalyst does not, however, reduce the levels of CO in the reactant fuel stream, but is slightly more tolerant towards the presence of CO than platinum electrocatalyst alone. However, again it has not yet been possible to fully attain the performance observed on pure hydrogen, ie in the absence of CO in the fuel stream, by using this approach in isolation.

The presence of $CO_2$ in reformate has previously not been believed to have a deleterious impact on the performance of the PEMFC. However, in a paper entitled "Electrocatalysis Issues in Polymer Electrolyte Fuel Cells" by M S Wilson et al, Proceedings of the 28th IECEC Conference, Atlanta, 1993, p 1.1203–1.1208, it can be seen that if the anode fuel stream comprises 75% hydrogen and 25% $CO_2$, with essentially no CO present, the performance of the PEMFC is again reduced. This is attributed to poisoning of the anode electrocatalyst by the $CO_2$. The presence of $CO_2$ had not previously been recognized as contributing to loss of fuel cell performance. The use of a platinum/ruthenium bimetallic anode electrocatalyst, rather than a pure platinum anode electrocatalyst, and with no bleed of air or oxygen into the anode chamber, again demonstrated a much reduced performance loss in the presence of $CO_2$. The improved performance was attributed to an increase in $CO_2$ tolerance of the bimetallic electrocatalyst compared with the pure platinum electrocatalyst, rather than to a reduction in levels of $CO_2$ in the fuel stream. The performance was closer to that expected in the absence of poisoning species in the fuel stream, but still does not fully attain the performance observed if no poisoning species were present in the fuel.

It thus appears that there exist two commonly used techniques for improving the performance of fuel cell anodes for operation on reformate fuel comprising high levels of $CO_2$ and trace levels of CO, ie the use of an air bleed and the use of a more poison tolerant electrocatalyst. However, the improvement the techniques offer are explained by the operation of two different reaction mechanisms. Firstly, with the air bleed technique, it is postulated that in the presence of oxygen the anode electrocatalyst facilitates the oxidation of CO to $CO_2$, as described in reaction (1) above. The low level of $CO_2$ produced from the CO does not have a major poisoning effect. Secondly, even in the absence of air bleed, the poisoning effect of both CO and $CO_2$ can be reduced by using a modified anode electrocatalyst (ie one that is more tolerant towards the poison). The mechanism proposed for this improvement is that the active sites on the modified electrocatalyst are less prone to poisoning by adsorption of the poisoning species and more sites are left available to perform the desired hydrogen oxidation reaction.

Currently low temperature fuel cells, such as the PEMFC and the PAFC, typically employ electrodes comprising a single catalyst component to accelerate the hydrogen oxidation and oxygen reduction reactions. The prior art provides many examples of this. For example, R Lemons in Journal of Power Sources, Vol 9, 1990, p251, shows that similar single component platinum catalysts are used for both anode and cathode reactions in SPFC technology.

In the case of the PEMFC, operating on reformate fuel containing $CO_2$ and CO in addition to hydrogen, this type of electrode does not provide sufficient activity or durability for practical applications. From a cost point of view it is desirable to use electrodes with loadings of the precious metal electrocatalyst of lower than 1.0 mg/cm$^2$ of electrode area At these loadings, it has not yet been possible to produce an anode electrocatalyst with high enough intrinsic tolerance to poisoning, such that, when no air bleed is employed, the performance is close to that observed with hydrogen fuel with no poisoning species present.

The air bleed technique has most frequently been employed in PEMFCs in which the anode also comprises a conventional single component electrocatalyst material. This is typically a mono-metallic platinum catalyst. Although it is possible to improve the performance of the PEMFC to close to the level that would be observed if no poisoning species were present, there are concerns over the long term sustainability of the performance when this conventional type of electrode is employed. This is particularly the case if high levels of air bleed, equivalent to 4% and above of the total reformate fuel volume, are required.

A recent approach to minimize the effect of CO poisoning by use of an air bleed is disclosed in U.S. Pat. No. 5,482,680. This patent discloses the use of a selective oxidation catalyst, present as a gas-porous bed or layer, placed between the fuel stream inlet of the fuel cell and the anode catalyst layer. In particular, the catalyst bed or layer can be placed in a variety of positions within the fuel stream manifold, including within the fuel stream inlet and fuel stream humidification apparatus.

Similar problems of electrocatalyst poisoning can occur in the cathode, where oxygen reduction is the desired reaction. Air is the most commonly used oxygen-containing reactant, and can contain poisons such as sulphur and nitrogen containing compounds, or trace metals such as lead. The presence of these materials can lead to a decrease in fuel cell performance due to a reduction in the effectiveness of the oxygen reduction electrocatalyst present in the cathode.

SUMMARY OF THE INVENTION

The present invention seeks to overcome the problem of electrode performance decay due to electrocatalyst poisoning by providing an electrode which has high activity and durability in the presence of poisons present in a reactant stream supplied to a fuel cell containing the electrode. The invention provides an electrode which has improved tolerance to the poisons present in the reactant stream and, in addition, provides a fuel cell including an electrode according to the invention.

Accordingly, the present invention provides an electrode which may be an anode or cathode comprising a first catalytic component and a second catalytic component, characterized in that the first catalytic component is active at gas-phase reaction sites and the second catalytic component is active at electrochemical reaction sites provided that when the electrode is an anode the first catalytic component and the second catalytic component are in physical contact. An advantage of having such an electrode is that each catalytic component can be selected based on its activity for the particular function it has to perform (ie reducing the level of poisoning species in a gas phase reaction or facilitating an electrochemical reaction). In one embodiment of the invention, the first and second catalytic components are in physical contact in both the anode and cathode.

Conventionally electrochemically-active sites in the electrode must comprise an ionically-conducting material in close proximity to the active sites. In the PEMFC, this is typically a form of the solid proton-conducting polymer electrolyte. Preferably, in an electrode of the present invention, the first catalytic component is not substantially in contact with the electrolyte while the second catalytic component is substantially in contact with the electrolyte.

Suitably, the first catalytic component treats a reactant gas stream to reduce the concentration of poisoning species. For example, the gas stream may be a reformate stream (hydrogen-containing fuel) fed to the anode, or oxidant stream (oxygen-containing reactant) fed to the cathode. The poisoning species to be removed typically include CO and $CO_2$ from the reformate stream and sulphur or nitrogen-containing compounds from the oxidant stream. The combined effects of a reduction in the level of these poisons from the reformate and/or oxidant streams will result in an improved electrode and improved fuel cell performance as measured by activity and durability.

Suitably, the second catalytic component is selected to enhance the rate of an electrochemical reaction in the presence of a reactant stream containing poisoning species. The presence of the second catalytic component contributes to an improved performance of the electrode as it is selected to be less prone to poisoning by the poisoning species present in the reactant stream and is therefore more capable of promoting the desired electrochemical reaction. Suitably, the second catalytic component enhances the rate of an electrochemical hydrogen oxidation or oxygen reduction reaction.

Suitably, the first and second catalytic components are arranged such that the reactant gas stream first contacts the first catalytic component, and thereafter contacts the second catalytic component.

Suitably, the catalytic components may be the same or different catalyst materials and are independently selected from the platinum group metals, gold or silver; or base metals or base metal oxides; or alloys or mixtures of one or more of these metals. The platinum group metals are platinum, palladium, rhodium, iridium, ruthenium and osmium. In one embodiment, the first catalytic component is platinum and the second catalytic component is a mixture of platinum/ruthenium.

DESCRIPTION OF PREFERRED EMBODIMENTS

Preferably each catalytic component is present in a separate layer in the electrode. In this embodiment where there is a layer of each catalyst, supported on for example, a carbon fibre paper or cloth substrate, the structure being effectively a bilayer or multilayer, the electrode can be designed to enhance the performance from each catalytic component. For example, the second catalytic component active at electrochemical reaction sites is formulated to ensure a high level of contact with the electrolyte material in order to enhance the amount of ionic contact between the electrolyte and the electrochemical catalytic component. It is desirable that the first catalytic component active at gas phase reaction sites should not contact a significant quantity of ionically-conducting electrolyte material and preferably should not contact any, as this may reduce its effectiveness. The separate layers may contain other noncatalytic components, such as polymeric binders, for example, polytetrafluoroethylene (PTFE). The first and second catalytic components may comprise the same catalyst material, but formulated in such a manner that one proportion of the catalyst material does not contact a significant quantity, if any, of ionically conducting electrolyte material thus forming the first catalytic component, and the remaining proportion has a high level of contact with the electrolyte thus forming the second catalytic component.

In an alternative embodiment, the first and second catalytic components may be present in a single mixed layer. This layer may optionally contain other materials such as forms of the solid proton-conducting polymer electrolyte, and other polymeric binders, such as PTFE. This embodiment allows manufacturing of the electrode with a small number of process stages. Alternatively, the electrode may comprise a combination of a separate layer and a mixed layer.

A further aspect of the invention comprises a fuel cell including at least one electrode according to the invention.

Suitably when fuel fed to the anode of the fuel cell is reformate containing residual levels of CO a fuel cell operates with addition of oxygen or oxygen-containing gas to the anode. The presence of air or oxygen, in combination with a first catalytic component reduces the level of CO poison, and results in greater improvements in electrode and fuel cell performance.

A further aspect of the present invention provides a membrane electrode assembly (MEA) comprising at least one electrode of the invention. A yet further aspect provides a PEMFC comprising an MEA of the invention.

A further aspect of the invention provides a process for preparing an electrode of the invention said process comprising applying the first and second catalytic components to a substrate either as separate layers or as a single mixed layer. The application of the catalytic components may be by any method known in the art and include filtration, powder vacuum deposition, spray deposition, electro-deposition, casting, extrusion, rolling or printing.

A yet further aspect provides a process for preparing an MEA of the invention comprising bonding to a solid polymer electrolyte two electrodes, wherein at least one of the electrodes is an electrode of the invention.

A still further aspect provides a process for preparing an MEA of the invention, wherein at least one of the anode or cathode components of the MEA is prepared by applying a first catalytic component to an electrically-conducting substrate, applying a second catalytic component to a solid proton-conducting polymer electrolyte and bringing together the substrate with first catalytic component and the solid proton-conducting polymer electrolyte with second catalytic component.

The invention will now be illustrated by Examples which are illustrative and not limiting of the invention.

EXAMPLE 1

Figure 1:
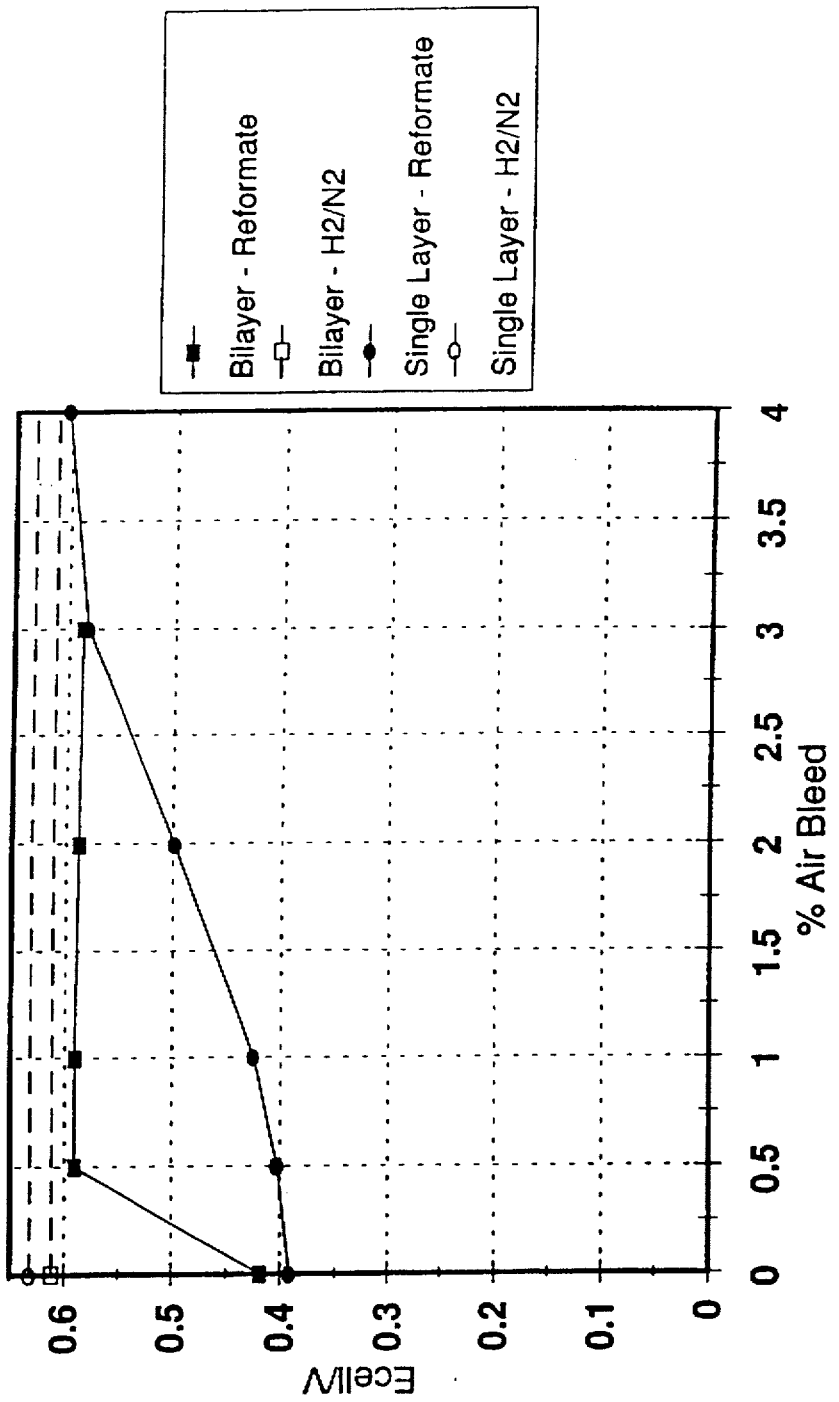
FIG. 1 shows the single cell performance of a PEMFC, as measured by the cell voltage at a fixed current density of 700 Amps per Square Foot (ASF) (1.0 ASF=1.076 $mA/cm^2$) containing MEAs with a series of anodes which are being supplied with hydrogen fuel containing 40ppm carbon monoxide (CO). The influence of increasing the air bleed concentration into the anode chamber of the cell, on the cell voltage at 700 ASF, is illustrated.

Two electrode performance evaluations are illustrated in FIG. 1. The conventional, state of the art electrode structure, comprising a single catalyst material, is referred to as a "single layer" electrode. This electrode was formed from an ink comprising a mixture of a platinum/ruthenium catalyst (from Johnson Matthey Inc., New Jersey, USA) supported on Cabot Vulcan XC72R surface area conducting carbon, such that the platinum loading is 20 wt %, together with a soluble form of DuPont's Nafion 117 perfluorosulphonic acid polymer electrolyte (obtained as a 5% solution of Nafion 1100 EW from Solution Technology Inc. of Mendenhall, Pa., USA). The electrode was formed by mixing the catalyst with the Nafion solution and coating the mixture on to a Toray TGP-090 carbon fibre paper substrate (from Toray Industries Inc., Tokyo, Japan), at a platinum loading of 0.25 mg/cm$^2$. This electrode formed the anode of an MEA, in which the polymer electrolyte membrane (Dow XUS-13204.10—an experimental membrane available from Dow Chemical Company, Freeport, Tex., USA) was hot pressed between the anode and a state of the art cathode formulated with a high loading of platinum black (4.0 mg/cm$^2$Pt). The face of the electrode comprising the catalyst layer is bonded directly to the membrane surface.

An example electrode of the invention comprises two different catalyst materials, and is referred to as a bilayer electrode. In this electrode two layers are formed on the Toray TGP-090 carbon fibre paper substrate. Firstly, a layer comprising a mixture of a mono-metallic platinum catalyst, produced at 20 wt %Pt supported on Vulcan XC72R carbon black, and mixed with a PTFE binder, was deposited onto the carbon fibre paper substrate. The platinum loading was 0.35 mg/cm$^2$. On top of the platinum catalyst layer a second layer comprising a platinum/ruthenium catalyst was then deposited. This layer was formed from an ink prepared with soluble Nafion 1100 EW polymer according to the procedure described in the comparative example. The loading of platinum in this layer was 0.25 mg/cm$^2$. The MEA was formed as described in the comparative example, with the Pt/Ru containing layer of the bilayer anode of the invention, being the face of the electrode bonded to the solid membrane electrolyte.

The data in FIG. 1 show the variation of cell voltage as an air bleed of increasing concentration is introduced into the anode gas stream just before it enters the fuel cell, for both MEAs. Performance on baseline fuel containing essentially no CO or CO$_2$, but diluted with inert gas to take account of the reduced concentration of hydrogen in the reformate, which does lower the cell performance, ie a mixture of 75% hydrogen and 25% inert nitrogen (H$_2$/N$_2$—75%/25%), and on reformate with 40 ppm carbon monoxide added to the baseline fuel (H$_2$/N$_2$/CO—75%/25%/40 ppm) is shown. Compared with the conventional electrode, when operating on the fuel mixture containing 40ppm CO, as the level of air bleed is increased the cell voltage obtained at 700 ASF from the cell comprising the bilayer electrode more rapidly approaches the cell voltage obtained at 700 ASF for operation on a baseline fuel which contains essentially no CO. The bilayer electrode attains a performance of within 20 mV of the H$_2$/N$_2$ baseline fuel after introduction of an air bleed of only 0.5%, whilst the conventional electrode comprising a single catalyst material requires an air bleed of >4% to reach a cell voltage close to the baseline fuel performance.

The bilayer electrode comprises an additional catalyst material, which has been incorporated specifically to increase the amount of gas-phase active catalyst sites. The comparable state of the art electrode comprises only one catalyst material, and was designed to possess only a high level of electrochemically active sites.

EXAMPLE 2

Figure 2:
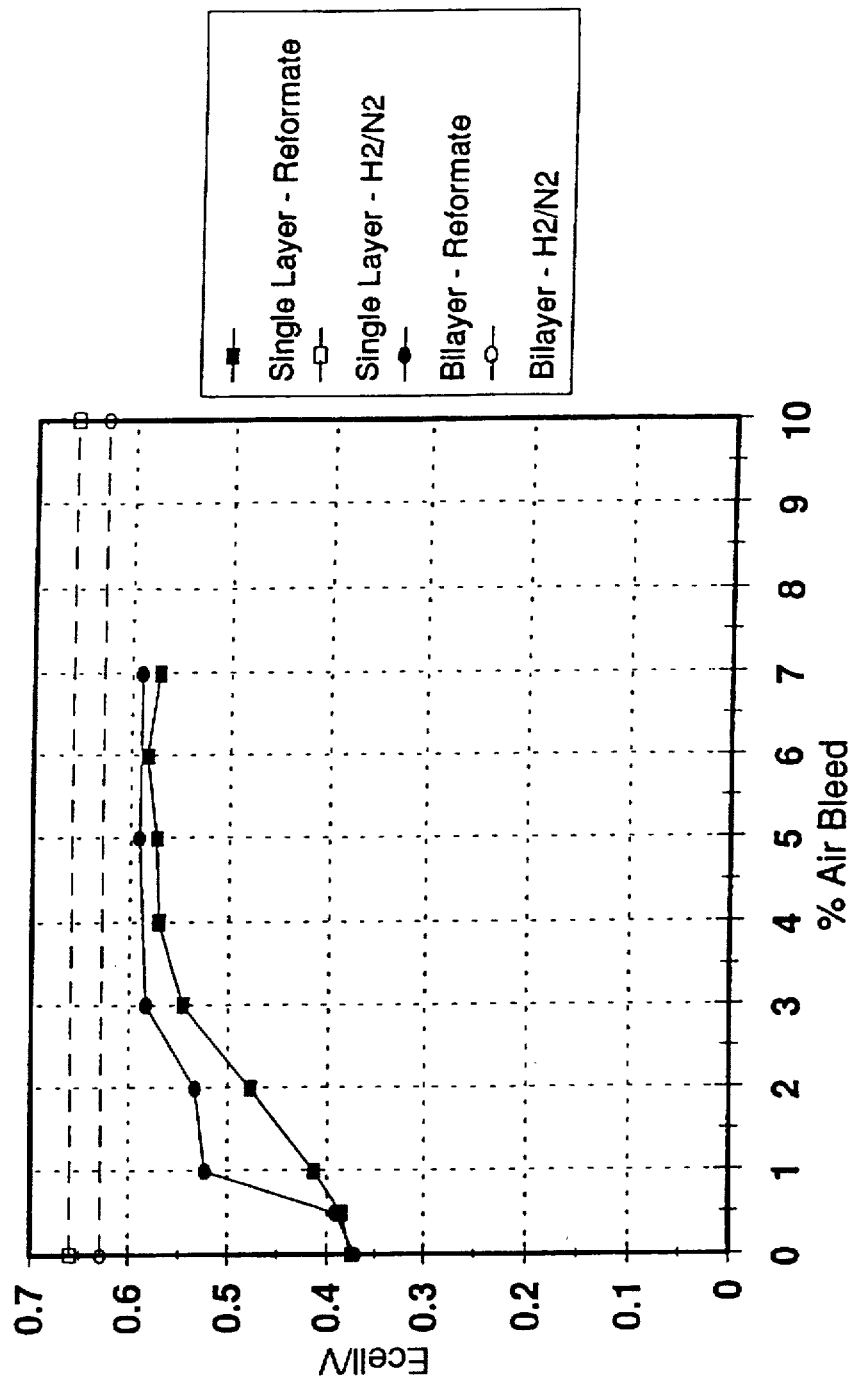
FIG. 2 shows the single cell performance of a PEMFC, as measured by the cell voltage at a fixed current density of 700 ASF, containing MEAs with a series of anodes which are being supplied with hydrogen fuel containing 25% by volume of carbon dioxide ($CO_2$) and 40ppm of carbon monoxide (CO). The influence of increasing the air bleed concentration into the anode chamber of the cell, on the cell voltage at 700 ASF, is illustrated.

Two electrode performance evaluations are illustrated in FIG. 2. The conventional, state of the art electrode structure, comprising a single catalyst material, is again referred to as a "single layer" electrode, and was fabricated as described in the first paragraph of Example 1.

An example electrode of the invention comprises two different catalyst materials, and is again referred to as a bilayer electrode. This electrode was fabricated as described for the bilayer electrode in Example 1, except that the platinum loading in the platinum/ruthenium electrochemically active layer formed on top of the platinum only gas-phase catalyst layer was 0.15 mg/cm$^2$.

The data in FIG. 2 show the variation of cell voltage as an air bleed of increasing concentration is introduced into the anode gas stream just before it enters the fuel cell, for both MEAs. Performance on baseline fuel containing essentially no CO or CO$_2$, but again diluted with inert gas ie a mixture of 75% hydrogen and 25% inert nitrogen (H$_2$/N$_2$—75%/25%) and on reformate comprising 25% carbon dioxide and 40 ppm carbon monoxide added to the baseline fuel (H$_2$/N$_2$/CO$_2$/CO—70%/5%/25%/40 ppm) is shown. Compared with the conventional electrode, when operating on the reformate fuel mixture containing CO and CO$_2$, as the level of air bleed is increased the cell voltage obtained from the cell comprising the bilayer electrode more rapidly approaches the cell voltage obtained on the baseline fuel which contains essentially no CO and CO$_2$. With an air bleed of 1%, the bilayer electrode is only 105 mV below the cell voltage attained on H$_2$/N$_2$, whereas the conventional electrode is 245 mV below the baseline cell voltage.

As in Example 1, the bilayer electrode comprises an additional catalyst material, which specifically increases the number of gas-phase active catalyst sites. The comparable state of the art electrode comprises only one catalyst material, and was designed to possess only a high level of electrochemically active sites only. The bilayer electrode gives improved performance when operating on a fuel mixture containing both carbon monoxide and carbon dioxide.

EXAMPLE 3

Figure 3:
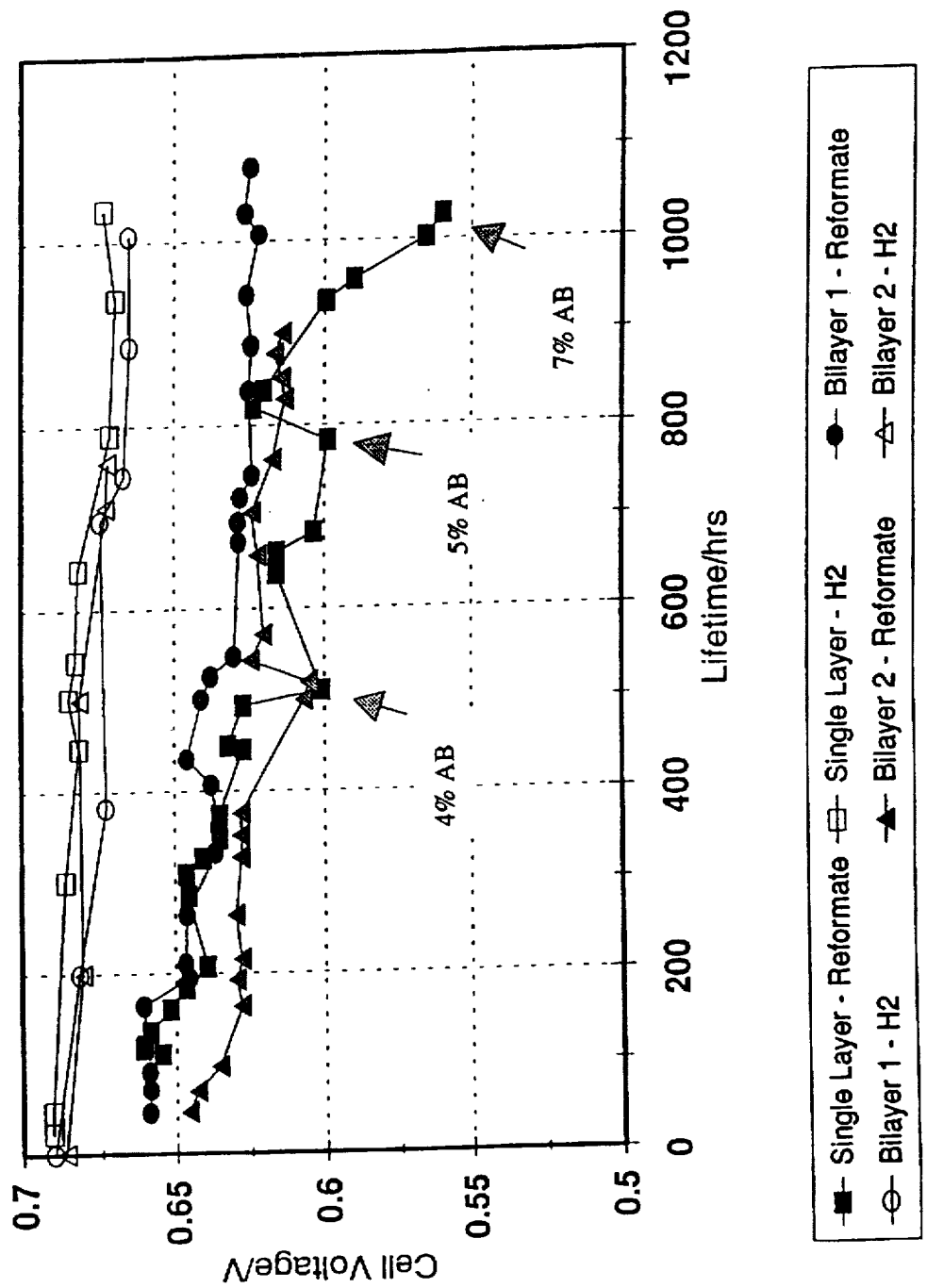
FIG. 3 shows the single cell performance of a PEMFC, as measured by the cell voltage at a fixed current density of 700 ASF, containing MEAs with a series of anodes which are being supplied with hydrogen fuel containing 25% by volume of carbon dioxide ($CO_2$) and 40ppm of carbon monoxide (CO). The influence of passing a fixed air bleed concentration into the anode chamber of the cell, on the cell voltage at 700 ASF, as a function of lifetime is illustrated.

Three electrode performance evaluations are illustrated in FIG. 3. The conventional, state of the art electrode structure, comprising a single catalyst material, is referred to as a "single layer" electrode. This electrode was formed from a mixture of platinum black (4.0 mg/cm$^2$ Pt) and rhodium black (1.33 mg/cm$^2$ Rh), with a PTFE binder, and was deposited on a Toray TGP-090 carbon fibre paper substrate. The formed electrode was coated with a layer of the soluble form of DuPont's Nafion 117 perfluorosulphonic acid polymer membrane to a loading of 0.36 mg/cm$^2$ Nafion, using a procedure as described in, for example, U.S. Pat. No. 4,876,115. This electrode formed the anode of an MEA, in which the polymer electrolyte membrane (Dow XUS-13204.10) was hot pressed between the anode and a state of the art cathode formulated from a high loading of platinum black (4.0 mg/cm$^2$ Pt), which had been coated with a layer of soluble Nafion 1100 EW polymer in a similar manner to that described above. The cathode Nafion loading was 0.40 mg/cm 2. The face of the electrode comprising the catalyst layer is bonded directly to the membrane surface.

Two example electrodes of the invention using bilayer electrodes comprising two different catalyst materials are illustrated in FIG. 3. In these electrodes two layers are formed on the Toray TGP-090 carbon fibre paper substrate. In "Bilayer 1", firstly, a layer comprising a mixture of a mono-metallic platinum catalyst, produced at 20 wt % Pt supported on Vulcan XC72R carbon black, and mixed with a PTFE binder, was deposited onto a carbon fibre paper substrate. The platinum loading was 0.3 mg/cm$^2$ Pt. On top of this layer, a second layer comprising a platinum black and a rhodium black was then deposited. This layer was formed by mixing platinum black (4 mg/cm$^2$) and rhodium black (1.33 mg/cm$^2$) with a PTFE binder. To this formed top layer was coated a layer of soluble Nafion 1100 EW polymer according to the procedure described in the comparative example. The Nafion loading was 0.37 mg/cm$^2$. The MEA was formed as described in the comparative example, with the platinum and rhodium containing layer of the invention, being the face of the electrode bonded to the solid membrane electrolyte. "Bilayer 2", also comprised a lower layer similar to that described for "Bilayer 1", comprising a layer of mono-metallic platinum catalyst produced at 20 wt % Pt supported on Vulcan XC72R carbon black and mixed with a PTFE binder. The platinum loading was 0.3 mg/cm$^2$. On top of this layer, a second layer was applied comprising a platinum/ruthenium catalyst, produced at 20wt % Pt and 10 wt % Ru supported on Vulcan XC-72R carbon black, and mixed with a PTFE binder. The platinum loading was 0.29 mg/cm$^2$. To this layer was applied a layer of soluble Nafion 1100 EW polymer according to the procedure described in the comparative example. The Nafion loading was 0.37 mg/cm$^2$. The MEA was formed as described in the comparative example, with the platinum/ruthenium catalyst-containing layer being the face of the electrode bonded to the solid membrane electrolyte.

The data in FIG. 3 show the variation of cell voltage as a function of operating time for all three MEAs. Performance on pure hydrogen fuel containing essentially no CO or CO$_2$, and on reformate containing CO and CO$_2$ (H$_2$/N$_2$/CO$_2$/CO —70%/25%/5%/40 ppm) is shown. A constant air bleed of 3% was introduced into the anode chamber, and maintained at this level, for "Bilayer 1" and "Bilayer 2", while for the conventional "Single layer" the air bleed was periodically increased from 3% to 4% to 5% and finally 7% to maintain acceptable performance. When operating on reformate fuel containing both CO and CO$_2$, the cell voltage decay with time is similar to that seen for operation on hydrogen, with a constant air bleed, compared to the conventional electrode, where periodic increases in air bleed level were required to maintain similar cell voltage decays with time. Indeed, at the end of the test the conventional electrode while operating with an air bleed level of 7%, gave a far inferior cell voltage, compared to the bilayer electrodes operating with a much lower air bleed level of 3%.

The bilayer electrodes comprise an additional catalyst material, increasing gas-phase active catalyst sites, which give superior lifetime performance when operating on reformate fuel, compared to conventional electrodes.

We claim:

1. An electrode which may be an anode or cathode comprising a first catalytic component and a second catalytic component, characterized in that the first catalytic component is active at gas-phase reaction sites and the second catalytic component is active at electrochemical reaction sites provided that when the electrode is an anode the first catalytic component and the second catalytic component are in physical contact, the first and second catalytic components being arranged such that a reactant gas stream will first contact the first catalytic component, and thereafter contact the second catalytic component.

2. An electrode according to claim 1, wherein the first catalytic component is one which is capable of treating a reactant gas stream to reduce the concentration of poisoning species.

3. An electrode according to claim 1, wherein the second catalytic component is selected to enhance the rate of an electrochemical reaction in the presence of a reactant stream containing poisoning species.

4. An electrode according to claim 1, wherein the first and second catalytic components comprise different catalyst materials and are independently selected from the group consisting of platinum group metals, golds, silver; base metals, base metals oxides, alloys and mixtures thereof.

5. An electrode according to claim 1, wherein each catalytic component is present in a separate layer in the electrode.

6. An electrode according to claim 1, wherein the catalytic components are present in a combination of a separate layer and a mixed layer in the electrode.

7. A fuel cell comprising an electrode according to claim 1.

8. A fuel cell according to claim 7, wherein said cell includes means for feeding reformate containing residual levels of CO to the anode and means for feeding oxygen or oxygen-containing gas to the anode.

9. A membrane electrode assembly comprising at least one electrode according to claim 1.

10. A proton exchange membrane fuel cell comprising a membrane electrode assembly according to claim 9.

11. A process for preparing a membrane electrode assembly according to claim 9 wherein at least one of the anode or cathode components is prepared by applying a first catalytic component to an electrically-conducting substrate, applying a second catalytic component to a solid proton-conducting polymer electrolyte and bringing together the substrate with first catalytic component and the solid proton-conducting polymer electrolyte with second catalytic component.

12. A process for preparing an electrode according to claim 1 comprising applying the first and second catalytic components to a substrate either as separate layers or as a single mixed layer.

13. A process for preparing a membrane electrode assembly comprising bonding to a solid polymer electrolyte two electrodes, wherein at least one of the electrodes is an electrode according to claim 1.

14. An electrode according to claim 1 wherein the first catalytic component consists essentially of platinum and the second catalytic component consists essentially of platinum and ruthenium.

* * * * *